Sept. 21, 1965   R. A. CUNNINGHAM   3,206,987
PARTICLE REFERENCE DEVICE
Filed Aug. 27, 1962   5 Sheets-Sheet 1

INVENTOR
ROBERT A. CUNNINGHAM

BY *Julian C. Renfro*
ATTORNEY

Sept. 21, 1965   R. A. CUNNINGHAM   3,206,987
PARTICLE REFERENCE DEVICE
Filed Aug. 27, 1962   5 Sheets-Sheet 2

INVENTOR
ROBERT A. CUNNINGHAM

BY *Julian C. Denfro*
ATTORNEY

Sept. 21, 1965 R. A. CUNNINGHAM 3,206,987
PARTICLE REFERENCE DEVICE
Filed Aug. 27, 1962 5 Sheets-Sheet 3

INVENTOR
ROBERT A. CUNNINGHAM

BY *Julian C. Renfro*
ATTORNEY

Sept. 21, 1965     R. A. CUNNINGHAM     3,206,987
PARTICLE REFERENCE DEVICE
Filed Aug. 27, 1962     5 Sheets-Sheet 4

FIG. 10

INVENTOR
ROBERT A. CUNNINGHAM
BY Julian C. Renfro
ATTORNEY

FIG. 11

3,206,987
PARTICLE REFERENCE DEVICE
Robert A. Cunningham, Orange County, Fla., assignor to Martin-Marietta Corporation, Middle River, Baltimore, Md., a corporation of Maryland
Filed Aug. 27, 1962, Ser. No. 219,648
7 Claims. (Cl. 73—517)

This invention relates to a sensing device for sensing forces such as accelerations and the like, and more particularly to a device of such type utilizing the principle of electrodynamic suspension for the support of a charged particle which will sense acceleration in three dimensions with very high accuracy.

It has been the goal of sensor designers to evolve a device that is free of all effects except the physical effect to be measured. For the measurement of acceleration the most commonly used sensor involves a mass suspended by a relatively non-dissipating suspension in a relatively nondissipating medium.

The ideal suspension involves the use of an electric force which is effective only upon the surface of the suspended charged mass, which is to be contrasted with magnetic forces, which operate upon the entire volume of material and thus incur losses such as hysteresis and eddy current loses. Electric and magnetic forces which avoid physical contact with the material in the suspension involve Earnshaw's law, which rules out a static suspension of a charged mass by truly static forces of either type.

In order to be an integral portion of a useful device, the suspended charged mass must be contained in a stable equilibrium, which requires that the suspension forces change in response to the external force environment. One method of changing these forces, or making them respond, is to use a servo arrangement, which is employed by present day electrostatic suspensions utilized in guidance work.

Another manner of changing these forces involves the construction in accordance with this invention of a "potential well" in the field so that the restoring force changes as a function of the position of the suspended mass. This potential well occurs when a nonuniform, alternating electric field is applied in a particular manner to a charged particle. Consequently, an illustrative device useful to explain the principles involved in this invention may be described utilizing electrodes deployed in a 3-dimensional array, which electrodes produce the alternating electric field in such a manner that the field increases in absolute magnitude in all directions from the center of the electrode assembly. A charged particle serving as the suspended charged mass is introduced into the potential well thus created.

The alternating electric field is accompanied by an alternating magnetic field; however, the charge-to-mass ratio of the particle serving as a suspended mass is extremely small and the velocities of the particle achieved in this invention are relatively low. Consequently, the electro-magnetic force between the particle (when in motion as described subsequently) and the alternating magnetic field are negligible. Thus, only the alternating electric field is of significance.

Due to the symmetry of the alternating electric field a region exists in its geometric center where the charged particle serving as a suspended mass will be maintained stationary under conditions of no acceleration. If the particle were displaced by small external force from this neutral position and such force removed, it would return to this position of static equilibrium at the center of the field. Under this static equilibrium condition the particle would experience no motion and would be viewed as a point.

To explain the actions of the particle while the device is under acceleration consider the device in free space and at rest, or in uniform rectilinear motion. Under either of these conditions, the particle will be at rest at the center of the alternating electric field configuration as described above since no external forces are acting on the device. Now assume for the moment that no electric field exists in the device and that the device is subject to acceleration. If this were true the particle would remain stationary in space, and the moving set of electrodes would be accelerating. Consequently, with respect to the electrodes, the particle would move in the opposite direction of the change of motion of the device. However, as previously explained, the alternating electric field produces a restoring force which as the particle tends to move with respect to the electrodes produces a force on this particle attempting to return it to its stable center position. However, the energy from the accelerating force is simultaneously imparted to the particle through the alternating electric field.

The situation is now present wherein a charged particle has absorbed energy from an external accelerating force and is off from the center of a symmertical alternating electric field. This combination of dynamic forces will cause the instantaneous position of the charged particle to vary with time in a pattern determined by the field configuration and described by the differential equation of motion for the system.

The instananeous position or locus of the charged particle in the field is governed by Mathieu's equation which is a differential equation where the parameters are varied by the alternating electric field. A general form of Mathieu's equation is $$\frac{d^2\mu}{dt^2}+\left(a-2q\cos\frac{\Omega t}{2}\right)\mu=0$$

where $\mu$ is the general term which can represent co-ordinates $x$, $y$ or $z$, $a$ and $q$ are dimensionless constants and $\Omega$ is the frequency in radians per second of the alternating electric field.

The solution of Mathieu's equation shows that the particle will oscillate about a center position, such center position being displaced from the center of the symmetrical alternating electric field. If the instantaneous kinetic energy of the particle is examined as it performs simple harmonic motion, an instantaneous force can be found. This force varies with time as is well known for simple harmonic motion. If this force is averaged over an integral number of periods of oscillation, an average force will be obtained. This time averaged force counteracts the force of the alternating electric field tending to return the particle to its static equilibrium position. Thus a new dynamic equilibrium state of the charged particle in the electric field congfuration is achieved. Since the solution of Mathieu's equation implies a stable oscillation that is uniform in amplitude and frequency, then this time averaged force will be constant and directly proportional to the acceleration experienced by the device. Thus, this force is equal to the product of the mass and acceleration.

Now consider that the acceleration of the device is increased, the force previously mentioned is now insufficient to maintain the same amplitude of oscillation, and there will result an increase in such amplitude. This increase again causes an increase in the time averaged force. Thus it is seen that the charged particle constitutes an accelerometer by virtue of the fact that the amplitude of vibration or oscillation of the particle is directly proportional to the acceleration of the device.

The arrangement used herein results in regions of stability where the particle is confined in the aforementioned potential well, analogues to the classical problem of the inverted pendulum. The full equations involved are difficult to interpret by a deductive approach, so a simpler way to visualize the physical action is to note that the particle has zero acceleration in the field center, and as it is displaced it is constrained to vibrate with increasing acceleration. To produce the acceleration requires work, so that the particle experiences time-averaged forces which cause it to seek the lowest potential. The lowest potential is in the center of the field, with particles far from the center describing a sinusoid of large amplitude and with particles closer to the center having smaller and smaller amplitude. In the presence of no acceleration, the suspended mass will be stationary, but in the presence of gravity or any other acceleration condition, there will be a displacement of the particle.

It should be noted at this point the inherent advantages of electrical suspension methods have long been recognized by the designers of inertial sensors, but the suspension of large masses, such as the hollow sphere used in existing electrostatic gyros requires extremely high electric gradients. These gradients can only be supported in an ultra high vacuum, which is a demand that adds considerably to design problems. These gradients also must be used with very small gaps if reasonable voltages are to be obtained and this type of construction demands the very best in precision and temperature controls to prevent spring torques and temperature drift. The Nordsiek Patent No. 3,003,356 is illustrative of a device designed to try to cope with these problems.

The present invention avoids these and other problems by using charged particles of high surface-to-volume ratio. Since electrical forces are acting on the surface area to support the particle whose mass is dependent upon its volume, the area-to-mass ratio is an indication of the gradient required. The area of a body is a function of the square of the dimensions while the volume or mass is of course a function of cube of the dimensions, so area-to-mass ratio increases as the linear dimension decreases. This also relates to charge-to-mass ratio, and when carried to the ultimate, results in the tremendous charge-to-mass ratio of the electron.

In order to secure the advantages of this new technique I found it best to employ a particle large enough to be visible to the aided eye, but small enough to have a large charge-to-mass ratio and thus permit the use of reasonable suspension voltages. The use of particles ranging in size from 2.5 to 250 microns requires gradients of 30 volts per centimeter per G. This is to be contrasted with gradients approaching one million volts/cm. commonly required for electrostatic gyros of the type presently in use. The sizes given are not restrictive, as particles of higher charge-to-mass ratio or smaller size such as ions, or molecules may be used if a higher frequency support field is used.

A physical device employed for carrying out the manifest advantages of this invention involves the use of a plurality of field electrode plates disposed so as to collectively define a 360-degree arrangement, as well as a pair of separated end plates disposed adjacent the field electrode plate array so as to be substantially perpendicular to the planes of the field electrode plates, thus to complete a substantially cubic array of plates. An electrodynamic suspension system is provided in the interior of this cubic array, being in the form of an alternating electrical potential existing between the field electrode plates on the one hand, and the end plates on the other hand. The electrostatic lines of force existing between each end plate and the field electrode plates is disposed in a continuous 360-degree array at each end of the cubic array, with the lines of force from the two ends being disposed closely enough together so as to define a location of lowest potential in the approximate center of the cubic array. The charged particle may be in the form of a droplet of oil some 25 microns in diameter that has been charged to a potential of approximately 1500 volts and placed into the cubic array, where the particle is held in the location of lowest potential. The particle is of course acted upon by any inertial or electrical force, with the particle resisting such force in order to maintain a stable equilibrium in the location of lowest potential. In so doing the particle will tend to oscillate at the frequency of the alternating potential that exists between the sets of plates of the cubic array, with the direction and the magnitude of the oscillation of the particle being a measure of the force.

An exemplary embodiment of this invention utilizes six plates, each of which is slightly separated from its adjacent plates of the cubic array, with the four field electrode plates being at a potential difference with respect to the two end plates, the difference in one small embodiment according to this invention being approximately 115 volts. Sixty cycle voltage is adequate, although the frequency may be as low as 16 cycles, and at least as high as 1000 cycles. In a zero G environment the charged particle will always be equidistant from all six plates and if properly illuminated would be viewed from any direction as merely a bright point. In any condition except a zero G environment, however, the particle will be responsive to the acceleration and will appear as an oscillating particle whose amplitude of oscillation is proportional to the magnitude of the acceleration input. For example, if the acceleration input is gravity alone, the length of the oscillation will be proportional to the force of gravity, whereas if the device is also subject to another acceleration, the two accelerations add vectorially to produce an acceleration which deflects the particle path into a new position of dynamic equilibrium.

Optical pickoffs utilized to observe the particle in the chamber do not sense particle position directly, so they do not limit the accuracy of the device. The pickoffs may also be designed to sense a fundamental frequency derived from the alternating current field, the magnitude of the alternating current output being proportional to the particle deviation from null. The phase of the oscillation as sensed by the pickoffs then gives the direction from null. Further, the pickoffs provide an error signal that can be amplified and fed back to the proper electrode to achieve a system null.

The acceleration sensor according to this invention is not confined to use in relationships in which the plane of its plates are disposed in any particular manner with respect to an acceleration input, which is a quality that admirably equips this device for use in missile environments and other environments in which G forces may be high. It is also important to note that my accelerometer is not limited to the measurement of acceleration in a single direction only, for it has adequately proven to be accurate for the indication of accelerations in three orthogonal directions, or differently stated, it can measure acceleration in any direction.

As an example of the use of this device, assume that it is desired to measure the acceleration forces acting upon a missile during flight. In this instance, my acceleration sensor would be mounted on the missile body and would give an indication of the magnitude of the acceleration of the missile by the length of the oscillation of the particle, with such length accurately indicating the total accelerations acting upon the missile, and direction of accelerations by the direction of the deflection.

These and other objects, features and advantages will be more apparent from a study of the appended drawings in which.

Figures 1, 1A:
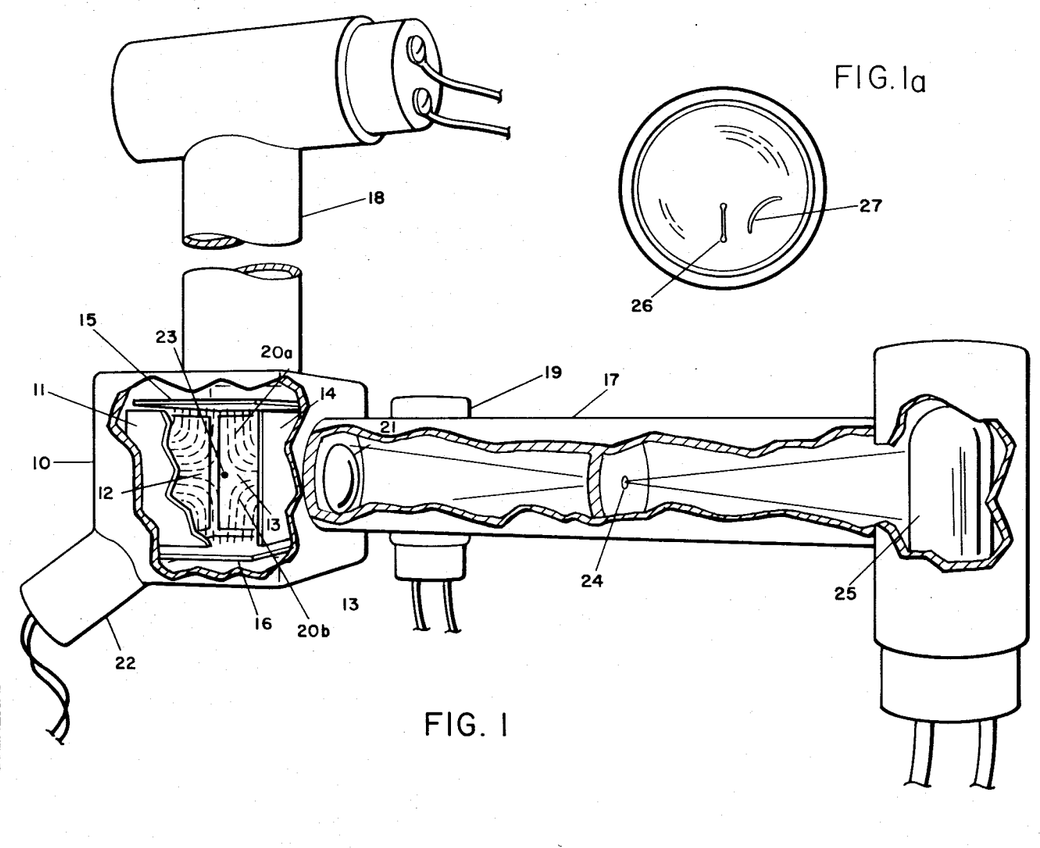
FIGURE 1 is a perspective view of an exemplary configuration of my device showing the cubic array of plates, the electrostatic lines of force acting between the plates, and a typical placement of pickoffs.
FIGURE 1a is a related view showing, on a substantially larger scale, a cross section of a photomultiplier tube, revealing particle oscillation patterns.

Referring to FIGURE 1, the housing 10 is revealed cut away for the purpose of the illustration of the plates that constitute the cubic array, which are employed in conjunction with this invention to create by the use of alternating voltage, the lines of force defining the "potential well" disposed in approximately the center portion of the plate array, in which the charged particle 23 is to be supported. Field electrode plates 11, 12, 13 and 14 are disposed in a 360-degree array in the housing, preferably spaced slightly apart as shown, whereas upper end plate 15 and lower end plate 16 are disposed slightly above and below the field electrode plates and approximately perpendicular to the plane of these plates so as to define therewith a substantially cubic array or chamber. By an appropriate system of electric connections to these plates, hereinafter discussed, the desired configuration of electrical lines of force 20a are created between upper end plate 15 and the field electrode plates, and lines of force 20b are created between lower end plate 16 and the field electrode plates. The plates 11 through 16 are of a conductive material such as brass, may be ⅜" on a side, and the gaps between plates may be 1/16". 115 volts A.C. is a sufficient potential for a device of this size, with larger chambers requiring proportionately larger A.C. voltages.

Figure 2:
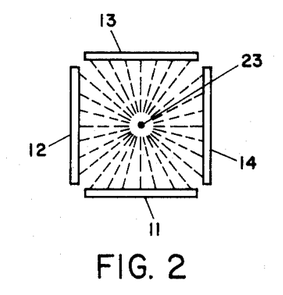
FIGURE 2 is the first of a series of related views, and represents a simplified showing of the imaginary lines of force as they appear in a top view, with each of the field electrode plates being disposed 90° to its adjacent field plates.

I prefer to maintain the field electrode plates 11, 12, 13 and 14 at ground potential, and impress the alternating current potential upon the end plates 15 and 16, but this is a preference and not a design requirement. As a result of the A.C. potential difference between the four field electrode plates and the end plates, lines of electrostatic force are created between each end plate and the four field electrode plates, the position of these lines being a function of the instantaneous potential of the applied voltage. In FIGURE 2, these lines of force appear as radial lines, whereas in FIGURES 3 and 4, these lines of force are seen to exist at each end of the device as a closed 360° pattern.

Figure 3:
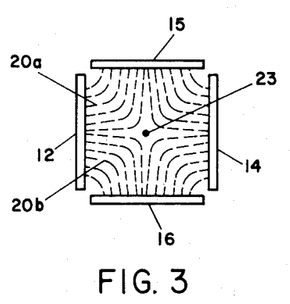
FIGURE 3 is a simplified showing of the imaginary lines of force between each end plate, and one pair of field electrode plates.
Figure 4:
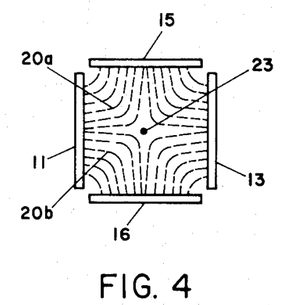
FIGURE 4 is a simplified showing of the imaginary lines of force between each end plate and the other pair of field electrode plates, which under usual circumstances appears substantially identical to FIGURE 3.

As indicated in FIGURES 3 and 4, the force fields substantially occupy the space between the top and bottom end plates, leaving a "potential well" in the approximate center of the cubic array defined by the six plates. The basic concept upon which this invention is grounded involves the placement of a charged particle in this potential well, such as by a nozzle maintained at high potential, where it will be substained in stable equilibrium in resistance to disturbing forces. The state of dynamic suspension is defined by a form of Mathieu's equation, which was discussed at length in an article entitled "Electrodynamic Containment of Charged Particles" by Wuerker, Shelton and Langmuir appearing in the Journal of Applied Physics of March 1959.

By virtue of the charged particle being held in the potential well, it can function as an acceleration sensitive mass, completely free of frictional and other undesirable forces, thus admirably equipping such an instrument for extremely precise measurements of inertial forces.

One arrangement for observing and utilizing the behavior of the charged particle involves the use of $x$, $y$ and $z$ axis pickoffs 17, 18 and 19, which are disposed in orthogonal relation to each other. As shown in FIGURE 1, in the cutaway portion of $x$-axis pickoff 17, a lens 21 may be disposed therein, which is adjacent a suitable aperture in plate 14, which is the plate nearest this pickoff. This lens may be regarded as a microscopic objective lens.

A light source 22 such as a 30 candlepower incandescent bulb is disposed to illuminate the suspension chamber, and is located at a 45° angle to the optical axis of each pickoff, with the arrangement being such that the reflected illumination from the charged particle can be observed through the lens of each pickoff. The focal length of each lens is such that the light from the charged particle 23 will be directed through a respective aperture, such as aperture 24, onto the sensitive surface of a photomultiplier tube, such as tube 25. Each of the three photomultiplier tubes may for example be of tube type 1P21.

Each aperture such as aperture 24 is employed so that the presentation of the activity of the charged particle will be such as to best be observed by the photomultiplier tube of its pickoff. The photomultiplier tubes are sensitive only the magnitude of illumination falling on their sensitive surfaces. Consequently, only if the illuminated particle is moving along the line of sight of a pickoff, or has a projection along the line of sight is the closeness or remoteness of the illuminated particle sensed by the photomultiplier tube.

Figure 5:
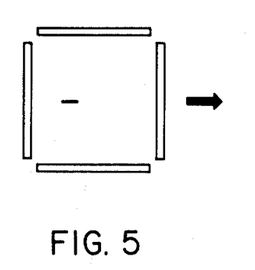
FIGURE 5 is a top view similar to FIGURE 2 and revealing the path of travel of the charged particle when the accelerometer accelerates in the resultant direction shown in FIGURE 6.
Figure 6:
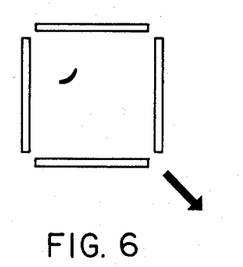
FIGURE 6 is a side view similar to FIGURE 3, in which the path of travel of the charged particle appears in a different attitude than in FIGURE 5 inasmuch as it moves along the force lines of FIGURE 3 on the side opposite the acceleration, when acceleration occurs as indicated in FIGURE 6.
Figure 7:
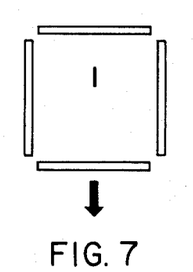
FIGURE 7 is a side view similar to FIGURE 4, in which the path indicated in FIGURE 6 now appears as a straight line on the side opposite the acceleration.

As will be noted from FIGURES 5, 6 and 7, the charged particle in the presence of an acceleration, such as an oblique acceleration of the device as it appears in FIGURE 6, will appear differently along the three orthogonal axes, but it is only the motion (or resultant motion) along a given axis that causes the photomultiplier tube of the pickoff of that given axis to give a readout. From comparing the paths of the charged particle appearing in FIGURES 5 through 7 with the respective corresponding FIGURES 2 through 4, it will be observed that the motion of the particle is always along a line of force. Therefore, as the charged particle moves in the direction opposite the acceleration of FIGURE 6, it oscillates about a line of force on the side of FIGURE 6 opposite the acceleration, whereas as seen in FIGURES 5 and 7, the same oscillation appears as a straight line. The $x$ and $y$ axis pickoffs 17 and 18 will be aware of the oscillation of this example.

FIGURE 1a reveals in the enlarged view of the particle oscillation patterns, that the particle may oscillate along a straight line 26, or along a curved line 27, depending upon the direction of the acceleration to which the device is subjected.

The dynamic range of my accelerometer will be greater if such a servo system is used such that the center of oscillation of the charged particle 23 is returned by means of a bias responsive to a closed loop system that senses the average displacement of the charged particle from its center, and produces a bias proportional to such displacement. Thus, the static electrical force necessary to return the particle to the center of the cubic array is equal in magnitude to the time-averaged accelerating force acting upon the particle.

Figure 8:
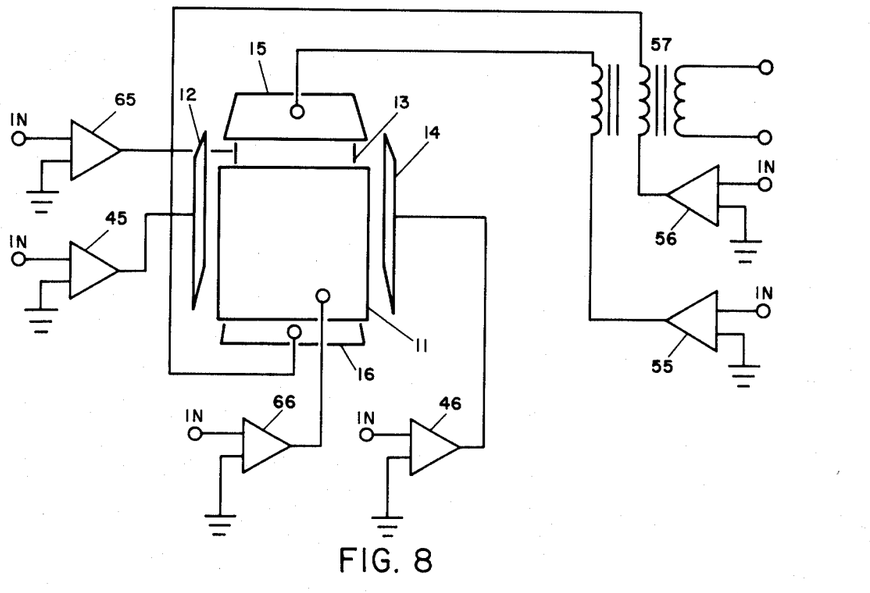
FIGURE 8 is a schematic perspective view showing the electrical relationships of the plates defining the cubic array.

The force balance arrangement may therefore utilize the output of the three pickoffs 17, 18 and 19 as received from their respective amplifiers 45–46, 55–56, and 65–66. This pickoff output is preamplified, filtered and detected by a phase-sensitive detector, such as a ring demodulator. The D.C. output of the phase detector is amplified by a D.C. amplifier, the output of which is used to provide the bias voltages to the plates associated with each pickoff. As shown in FIGURE 8, the amplifiers 45 and 46 are disposed in the circuit to plates 12 and 14, and the amplifiers 65 and 66 are disposed in the circuit to plates 11 and 13. Amplifiers 55 and 56 are inserted in series with individual alternating current windings on transformer 57 to supply the y axis plates, otherwise known as the end plates, with not only the suspension voltage but also the servo voltage. Transformer 57 serves as an isolation transformer. I have found that the servo voltages may be approximately 10 volts per G, with a linear relationship existing between this voltage and acceleration inputs.

As is therefore to be seen, the amplifiers may be used to provide electrical forces to cancel or null the acceleration forces on the charged particle, thus amounting to a null servo system. The use of six amplifiers is a preferable biasing arrangement for the plates, for it is necessary to arrange the polarity provided to each of the plates such that an electrical force will be created which is opposite to the acceleration force on the particle. This is to say, the acceleration force may be in either direction with respect to a given pair of plates, so therefore the D.C. polarity of the plates usually must reverse to match such acceleration.

Accordingly, a pair of amplifiers are required to provide electrical balancing forces in each of the $x$, $y$, and $z$ directions. As is discussed hereinafter in conjunction with FIGURE 10, each amplifier is capable of having either a positive or a negative output, with the output of each amplifier of each pair always being balanced by an identical voltage of the opposite polarity. Thus, each plate of the array receives a D.C. voltage whose polarity is opposite that of the opposite plate, this being accomplished by using a push-pull connection between the D.C. amplifiers associated with each given pair of opposite plates.

Figure 9:
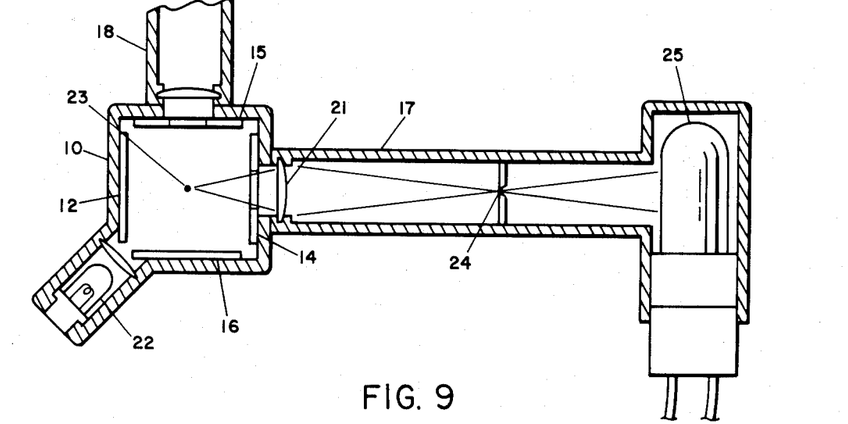
FIGURE 9 is a cross sectional view of a preferred pickoff arrangement.

Referring to FIGURE 9, it will be seen that the preferred optical pickoff utilized in conjunction with this invention involves, as previously mentioned, objective lens 21 disposed adjacent the location of the charge particle in the potential well, a plate in which aperture 24 is located, and a sensitive surface, such as possessed by a photomultiplier tube 25, upon which the light from the illuminated particle is focused.

It is significant to note that uniquely this pickoff arrangement has no output unless motion of the illuminated particle is present, for although there is both an A.C. and a D.C. component from the photomultiplier tube, the D.C. is eliminated in the pickoff by an appropriate filter, hereinafter discussed. Therefore, as the charged particle oscillates, an A.C. component at the field frequency serves as the sensing signal. Inasmuch as there is no A.C. signal in the absence of oscillation of the particle, it is unnecessary to establish for this pickoff a zero reference point, such as would be required by pickoffs of the prior art.

Because of this arrangement, motion of the particle across the line of sight of the lens and aperture will not modulate the light falling upon the sensitive surface. Rather, it is only a change in the amount of light emanating through the aperture that causes a change in readout of the tube 25, such change in light through the aperture of course being brought about by motion of the illuminated particle along the aforementioned line of sight.

Similarly, the pickoffs of the other two axes will only sense motion of the illuminated particle along their respective lines of sight, so by arranging for the three photomultiplier tubes of the orthogonally disposed pickoffs to have separate outputs, the acceleration of the device in any direction can be resolved into three axes, which is of course information that can be directly utilized.

Figure 10:
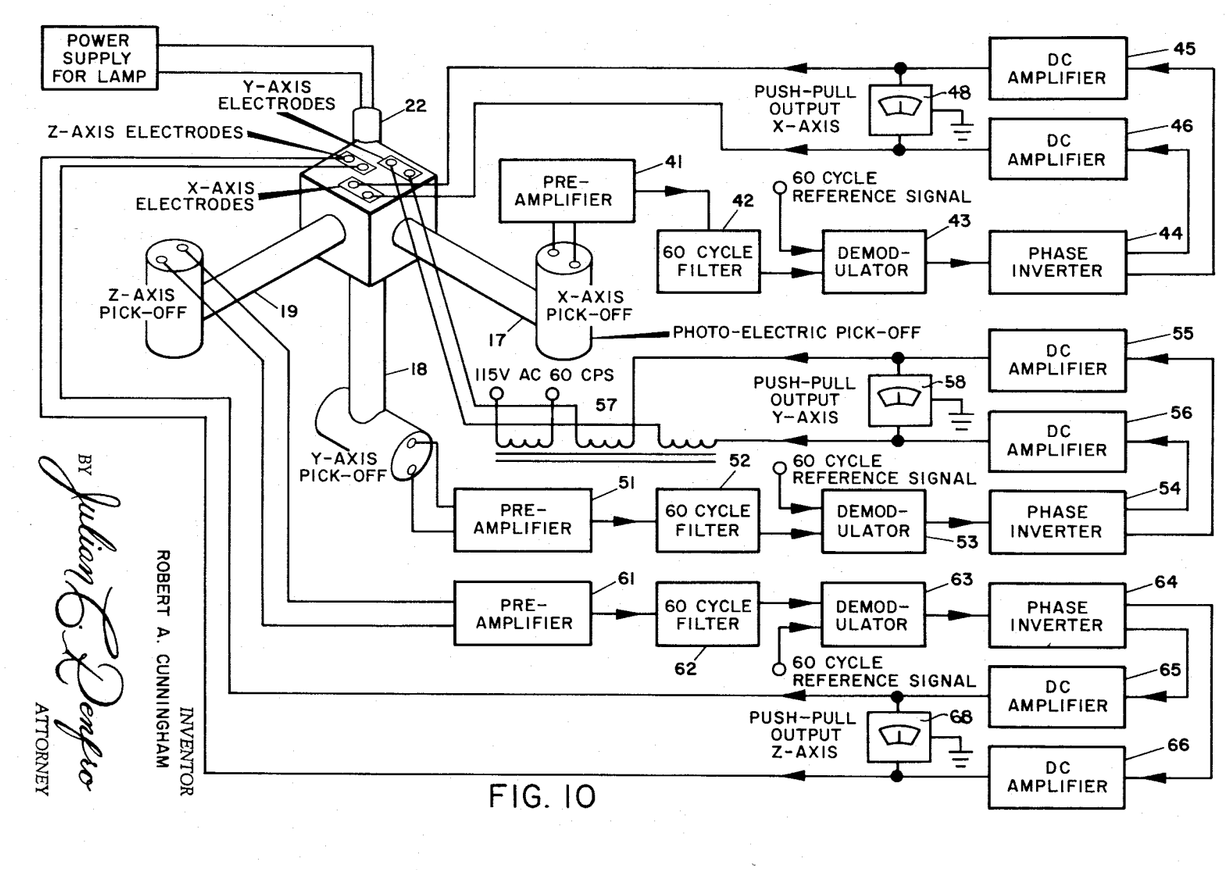
FIGURE 10 is a detailed electrical block diagram of a three-axis accelerometer arrangement.

Referring to FIGURE 10, the complete diagram of the three axis accelerometer is there revealed. The output of the photomultiplier tube of the $x$ axis pickoff is connected to a preamplifier 41, where the A.C. signal is amplified to a level sufficient for efficient filtering in the 60 cycle filter 42. This filter eliminates all frequencies higher or lower than the fundamental 60 cycle output, and the filtered A.C. output is then converted to D.C. by the ring demodulator 43 where it is detected and phase referenced to the A.C. support voltage. This is done so that it can be determined if the particle is experiencing a positive or negative acceleration. The D.C. output of the demodulator is then processed by a phase inverter 44 where the original signal is preserved and another output is provided 180° out of phase. The in-phase and out-of-phase signals are then amplified by push-pull D.C. amplifiers 45 and 46. These two signals are fed-back to the matching field electrode plates 12 and 14. The system involving the $z$ axis pickoff is virtually identical, for preamplifier 61, 60 cycle filter 62, demodulator 63 phase inverter 64, and amplifiers 65 and 66 function in the same manner as their counterparts of the $x$ axis.

The $y$ axis is also identical to the same extent, but with the addition of the transformer 57. The D.C. signals from the amplifiers 55 and 56 may be regarded as being connected to the secondary of transformer 57, with the 60 cycle input to the primary of this transformer being used for providing the A.C. voltage for the electrodynamic suspension.

The same D.C. output voltage applied to the plates is used as the output voltage of this system, and is proportional to and representative of the acceleration along each axis. The output voltages for the $x$, $y$ and $z$ channels may be read from output voltmeters 48, 58 and 68, respectively. This system therefore constitutes a force balance or null servo system, which is very advantageous in instruments which require good linearity and high accuracy. As will be apparent to those skilled in this art, this is a servomechanism of a common type in which the output of each photomultiplier is the error signal which is amplified and feed back to the field electrode plates in a phase relationship that will oppose the inertial force with an equal and opposite electrical force. Feedback is negative and will maintain a stable system so that the charged particle will be always electrically controlled to the center of the chamber defined by the six plates. A minimum error signal is obtained as in any stable servo system.

Standard components are involved in the arrangement according to FIGURE 10, and may for example be selected from Radio Engineers' Handbook by Terman (Copyright 1943). The preamplifiers 41, 51 and 61 may be class A low frequency amplifiers that are resistance coupled as shown on page 355 of Terman. The filters may be standard parallel resonant circuit filters as shown on page 141 of Terman, and the demodulators may as previously mentioned be standard ring demodulators, such as shown on page 553 of Terman. The phase inverters may be standard, such as shown on page 383, and the amplifiers standard push pull D.C. amplifiers as shown on page 376 of Terman. The voltmeters 48, 58 and 68 may be vacuum tube voltmeters with balanced inputs.

Figure 11:
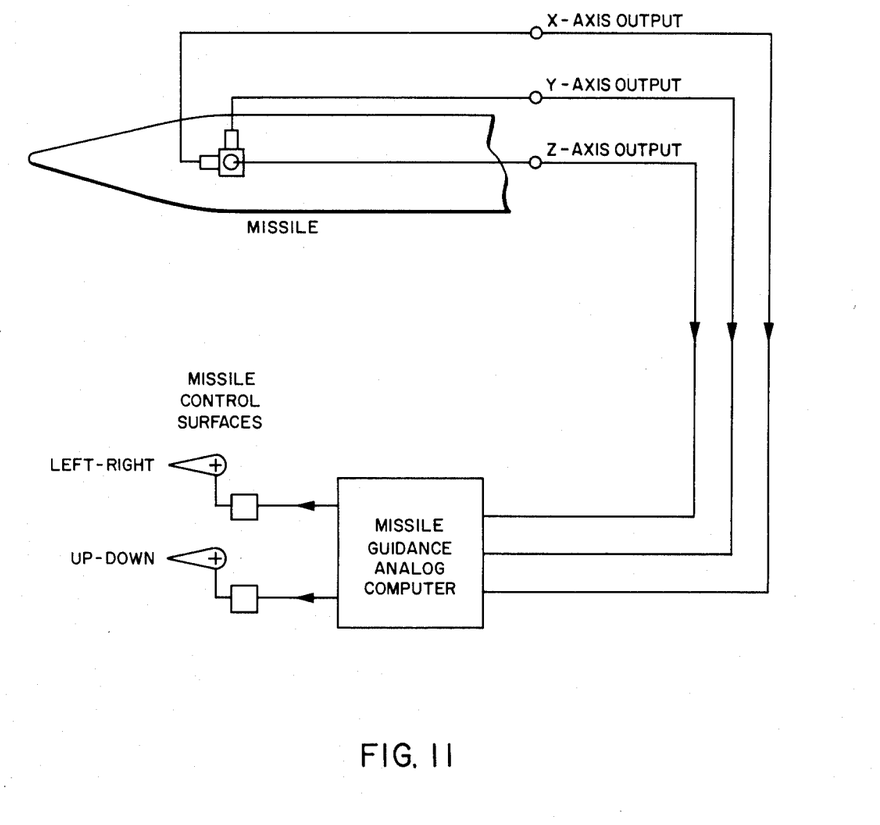
FIGURE 11 is a schematic diagram in accordance with which the control surfaces of a missile or the like may, in accordance with this invention, be operated from charged particle accelerometer outputs.

As shown in FIGURE 11, the $x$, $y$ and $z$ outputs from an accelerometer according to this invention can be utilized in an analogue computer connected as a so-called strapped-down inertial guidance system. The computer may be electro-mechanical. The signals from the three axis of the accelerometer are resolved in navigation components by resolvers which are controlled by a gyro or other directional reference. These resolved signals are then integrated to obtain velocity and integrated again to obtain a signal representing distance traveled. The navigational signals thus derived are compared to a preset guidance program and the resulting voltages can be used to operate a hydraulic servo which will actuate the missile control surfaces.

As will be observed by those skilled in the art, my invention represents a fundamental technique for utilizing charged particles to perform the tasks heretofore performed only by much more massive, elaborate and complicated equipment. By placing a charged particle in a substantially cubic array of plates, the particle will be maintained in the center thereof by the lines of force created between certain of the plates, with the particle departing from the center of the array as a result of accelerations to which the array is subjected. The lines of force depicted in certain of the drawings herein represent the path a charged particle of zero inertia would take if released at a given point. Inasmuch as alternating current is employed upon the end plates, the charged particle will be forced to oscillate along a line of force. In the case of acceleration due to gravity, if the lower end plate is disposed horizontally, the particle will oscillate along a line of force (not shown in the drawings) that is virtually orthogonal to the lower end plate.

Due to the configuration of the alternating current field, the charged particle will tend to move with larger amplitude the further it is from the geometric center of the plate array, but by utilizing a closed loop servo system, the oscillations of such particle will be kept to a minimum.

It should be pointed out that although the possible implication of the term "potential well" may be a point in a chamber, nevertheless the potential well may in fact assume the configuration of a closed path, such as a circle, ellipse or even an irregular figure. The shape of the potential well is a function of the electrode configuration, which can be properly synthesized by mechanically shaping the electrode structure to achieve the desired shape of the potential well in which the charged particle is stable.

The cubic arrangement of the chamber can be altered to extreme dimensions if the A.C. support voltage is adjusted to maintain a gradient of sufficient strength between the end electrodes and the field electrode plates. For example, I have found that a two-inch chamber of four field electrode plates with grounded end plates at a great distance can stably support a charged particle with 3000 volts of 60 cycle alternating current disposed between the four field electrodes and ground.

The identity of my invention is preserved if at least two electrodes are employed, across which an alternating electric potential field is impressed, so long as one of these electrodes will define a field gradient having a location at which the energy input to the charged particle in the field is a minimum. The interaction between the field and the particle causes the particle to be stably suspended, thus making it capable of use in measuring inertial or electrical forces. Either of these two electrodes can be in the configuration of a closed assembly, but in all configurations a continuous field must exist between the two electrodes.

Although separate field electrode plates are more convenient than a continuous field electrode configuration in that they readily permit the use of bias voltages for servo control or measurement purposes, nevertheless the field electrode plate or plates may be in the form of a circular or rectangular configuration, or even in other configurations such as an ellipse or other arbitrary surface, so long as a potential well can exist in the vicinity of at least two conductive surfaces. By the latter it is meant that an electrical field gradient can be established in space by two surfaces, even though one of the surfaces is a virtual surface.

I have herein described an optical pickoff, it is to be noted, however, that other arrangements may be used for this purpose such as electrostatic, magnetic or even other optical arrangements. Such other optical method could operate on the position of the particle perpendicular to the line of sight of the optical pickoffs. As to electrostatic pickoff arrangements, this method would use the motion of the charged particle inducing a voltage in the electrodes which could be separated from the suspension voltage. A magnetic pickoff may be desired by utilizing the magnetic field created by a charged particle in motion, or the charged particle itself may be a magnetic material. Pickoff would be accomplished by surrounding the chamber with coils of wire.

Despite the fact that I have described my invention as primarily being an acceleration sensing device, it must be borne in mind that this invention is one of considerable breadth and accordingly capable of being utilized in other environments and is for other purposes then stated hereinbefore. For example, a particle of material may be charged and placed in a chamber. Measurements can be made of the magnetic and electrical properties of materials by measuring the deflection when the chamber is placed in an external magnetic field. Another example may involve the measurement of vacuum by connecting the chamber to a vacuum to be measured, with the indication of pressure being observed by the particle deflection as influenced by the buoyancy of the gases remaining in the vacuum. For a vacuum measuring device, it is not necessary to provide for observation of the particle's displacement along three axes, and to this end I may provide only a single axis observation arrangement.

As to the charging means, there are many possible arrangements for supplying either a charged solid particle or a charged droplet to the chamber, but a preferred method involves the use of hypodermic needle connected to a reservoir of fluid with the hypodermic needle momentarily raised to a high potential. The droplets are of course injected into the chamber while the alternating field is being maintained at full strength.

Although this invention has been described in terms of a closed loop servo arrangement, it may be employed for operating a control circuit or the like in which no servo arrangement is involved. It must be borne in mind that it is not absolutely necessary for an electrical system to involve a servo arrangement, for in many instances the output of the pickoff arrangement can be used directly in a control circuit of simple design. Additionally, my invention may be involved using direct observation methods in which the operator of the device after observing the behaviour of the charged particle with a microscope or the like can then employ the output so derived as a means of levelling an object, for as should be apparent, the charged particle except in a zero G environment is always in oscillation as a result of gravity.

It should be noted that the charged particle may be charged either positively or negatively, for a given servo arrangement will function in a given manner in either case. However, the polarity of the output signals if read on output meters will be opposite.

Other embodiments within the spirit of this invention will become apparent to those skilled in this art, and all embodiments that come within the scope or range of equivalency of the appended claims are intended to be included therein.

I claim:

1. An acceleration sensing device utilizing a particle of high charge-to-mass ratio comprising at least one field electrode disposed so as to define a substantially closed array, a pair of separated end electrodes disposed adjacent said field electrode, means for providing an electrodynamic suspension system between said electrodes, said means including an alternating potential existing between said field electrode on the one hand, and said end electrodes on the other hand, the electrostatic lines of force existing between each end electrode and the field electrode being disposed in a continuous 360° array at each end of said electrode arrangement, with such lines of force at the ends of the arrangement being disposed closely enough together as to together define a location of lowest potential in the approximate center thereof, a charged particle disposed in said location of lowest potential and being acted upon by any inertial or electrical force, said charged particle resisting such force in order to maintain a stable equilibrium in said location of lowest potential, and in so doing tending to oscillate at the frequency of said alternating potential existing between said electrodes, the direction and magnitude of the oscillation of said particle being a measure of said force, an optical pickoff for sensing the oscillation of said charged particle, said pickoff being arranged to supply output signals to an amplification means having an output, said amplification means being restricted in frequency response to non-zero frequencies, means for converting the output of said amplification means to an essentially D.C. signal, a force balance system for utilizing said D.C. signal to supply a counter electric force to said end electrodes to maintain said particle in a substantially null condition, said pickoff having no output unless oscillatory motion of said charged particle is present, said charged particle thus being substantially restricted to said location of lowest potential without the physical dimensional coordinates of such location being used as a reference.

2. The acceleration sensitive device as defined in claim 1 in which an optical pickoff is disposed in each of three orthogonal axes, each pickoff supplying an output based upon accelerationn of said particle along its respective axis.

3. An acceleration sensing device utilizing a particle of high charge-to-mass ratio comprising a plurality of field electrode plates, said plates being disposed so as to collectively define a 360° array, a pair of separated end plates disposed adjacent said field electrode plates and substantially perpendicular to the planes of said field electrode plates so as to complete a substantially cubic arrangement, means for providing an electrodynamic suspension system in the interior of said cubic arrangement, said means including an alternating potential existing between said field electrode plates on the one hand, and said end plates on the other hand, the electrostatic lines of force existing between each end plate and the field electrode plates as a result of said alternating potential being disposed in a continuous 360° array at each end of said cubic arrangement, with such lines of force at the ends of the arrangement being disposed to together define a location of lowest potential in the approximate center of said cubic array, a charged particle disposed in said location of lowest potential, and being acted upon by any inertial or electrical force to which said cubic array is subjected, said charged particle resisting such force in order to maintain a stable equilibrium in said location of lowest potential, and in so doing tending to oscillate at the frequency of said alternating potential existing between said plates, the direction and magnitude of the oscillation of said particle being a measure of said force, an optical pickoff for sensing the oscillation of said charged particle, said pickoff being arranged to supply output signals to an amplification means, but having no output in the absence of oscillatory motion of said particle, said amplification means being restricted in frequency response to non-zero frequencies, means for converting the output of said amplification means to an essentially D.C. signal, a force balance system for utilizing said D.C. signal to supply a counter electric force to said end electrodes to maintain said particle in a substantially null condition, said charged particle thus being substantially restricted to said location of lowest potential without the physical dimensional coordinates of such location being used as a reference.

4. The acceleration sensing device as defined in claim 3 in which a pickoff arrangement is employed in each of three orthogonal axes to sense the movements of said charged particle, the outputs of said pickoffs not only serving in conjunction with each pair of opposite plates to apply a counter electric force to said charged particle to maintain it in a null condition, but also furnishing the output of said device in the form of an indication of the acceleration along each of said three axes.

5. An optical pickoff arrangement for observing the behavior of the charged particle in the alternating potential of the acceleration sensing device according to claim 3, comprising an illumination means for illuminating said particle, an objective lens disposed adjacent said location of lowest potential, said lens focusing the light emanating from said particle on a plate, an aperture in said plate through which light may fall onto a sensitive surface, the motion of said particle in the alternating electric field causing the focused image of the particle to move correspondingly and thus modulate the light falling upon said sensitive surface, said pickoff having no output unless motion of said particle is present along the line of sight of said lens and aperture.

6. The acceleration sensitive device utilizing the optical pickoff arrangement defined in claim 5 in which an optical pickoff is disposed in each of three orthogonal axes, each pickoff supplying an output based upon acceleration of said particle along its respective axis.

7. An optical pickoff arrangement for observing the behavior of an illuminated charged particle in an alternating electric field, said field defining a gradient having a location at which the energy input to said charged particle is a minimum, thus defining a location at which said particle is stably suspended, said pickoff arrangement comprising an objective lens disposed adjacent the location at which the charged particle is stably suspended, said lens focusing the light emanating from said particle on a plate, an aperture in said plate through which light may fall onto a sensitive surface, the motion of said particle in the alternating electric field causing the focused image of the particle to move correspondingly and thus modulate the light falling on said sensitive surface, said pickoff being arranged to supply output signals to an amplification means, but having no output in the absence of oscillatory motion of said particle, said amplification means being restricted in frequency response to non-zero frequencies, means for converting the output of said amplification means to an essentially D.C. signal used to normally maintain said particle in a substantially null condition, said charged particle thus being substantially restricted to said stable location without the physical dimensional coordinates of such location being used as a reference for said pickoff.

References Cited by the Examiner

UNITED STATES PATENTS

| | | | |
|---|---|---|---|
| 2,691,306 | 10/54 | Beams | 73—517 |
| 3,003,356 | 10/61 | Nordsieck | 73—517 |
| 3,011,347 | 12/61 | Boitnott | 73—382 |
| 3,065,640 | 11/62 | Langmuir | 73—517 |

RICHARD C. QUEISSER, *Primary Examiner.*

ROBERT L. EVANS, JAMES J. GILL, *Examiners.*